(12) United States Patent
Itabashi et al.

(10) Patent No.: US 9,427,901 B2
(45) Date of Patent: Aug. 30, 2016

(54) METHOD OF MANUFACTURING FOAM MOLDED PRODUCT, APPARATUS FOR MANUFACTURING FOAM MOLDED PRODUCT, AND FOAM MOLDED PRODUCT

(75) Inventors: Taichi Itabashi, Yokohama (JP); Taisuke Yonezawa, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 784 days.

(21) Appl. No.: 13/809,336

(22) PCT Filed: Jul. 14, 2011

(86) PCT No.: PCT/JP2011/066068
§ 371 (c)(1),
(2), (4) Date: Jan. 9, 2013

(87) PCT Pub. No.: WO2012/008518
PCT Pub. Date: Jan. 19, 2012

(65) Prior Publication Data
US 2013/0122258 A1 May 16, 2013

(30) Foreign Application Priority Data

Jul. 14, 2010 (JP) ................................. 2010-159599

(51) Int. Cl.
| | |
|---|---|
| *B29C 44/04* | (2006.01) |
| *B29C 44/12* | (2006.01) |
| *B29C 44/58* | (2006.01) |
| *B32B 3/30* | (2006.01) |
| B29C 33/10 | (2006.01) |
| B29L 31/58 | (2006.01) |

(52) U.S. Cl.
CPC ......... *B29C 44/1271* (2013.01); *B29C 44/588* (2013.01); *B32B 3/30* (2013.01); *B29C 33/10* (2013.01); *B29L 2031/58* (2013.01); *Y10T 428/24496* (2015.01)

(58) Field of Classification Search
CPC .......... B29C 44/1271; B29C 44/1276; B29C 44/129; B29C 44/14; B29C 44/148; B29C 44/588; B32B 3/30
See application file for complete search history.

(56) References Cited

U.S. PATENT DOCUMENTS 5,098,270 A * 3/1992 Rohn .................... B29C 44/143
249/93

FOREIGN PATENT DOCUMENTS

| JP | 54-133570 A | 10/1979 |
|---|---|---|
| JP | 06-339935 A | 12/1994 |
| JP | 09-174577 A | 7/1997 |
| JP | 2004-358910 A | 12/2004 |
| JP | 2005-081575 A | 3/2005 |
| JP | 2006-015664 A | 1/2006 |
| JP | 2009-285942 A | 12/2009 |

OTHER PUBLICATIONS

International Search Report for PCT/JP2011/066068, dated Sep. 27, 2011.

* cited by examiner

*Primary Examiner* — Stella Yi
(74) *Attorney, Agent, or Firm* — Sughrue Mion, PLLC

(57) ABSTRACT

The present invention is a method of manufacturing a foam molded product in which a foam molded product (1A, 1B) is formed by integrally adhering together a foam body (2) that is formed by the foaming of a foaming raw material, and an air-permeable component (3) using an apparatus for manufacturing a foam molded product (1A, 1B) that is provided with a cavity (23) between a plurality of mold components (21, 22, 31) that is defined by respective cavity surfaces (21*a,* 22*a,* 31*a*) of the mold components (21, 22, 31).

1 Claim, 7 Drawing Sheets

METHOD OF MANUFACTURING FOAM MOLDED PRODUCT, APPARATUS FOR MANUFACTURING FOAM MOLDED PRODUCT, AND FOAM MOLDED PRODUCT

CROSS REFERENCE TO RELATED APPLICATIONS

This application is a National Stage of International Application No. PCT/JP2011/066068, filed on July 14, 2011, which claims priority from Japanese Patent Application No. 2010-159599, filed Jul. 14, 2010, the contents of all of which are incorporated herein by reference in their entirety.

TECHNICAL FIELD

The present invention relates to a method of manufacturing a foam molded product formed by integrally adhering together a foam body formed by the foaming of a foaming raw material, and an air-permeable component, to an apparatus for manufacturing a foam molded product, and to a foam molded product. Priority is claimed on Japanese Patent Application No. 2010-159599, filed Jul. 14, 2010, the contents of which are incorporated herein by reference.

TECHNICAL BACKGROUND

A method such as that disclosed, for example, in Patent document 1 (see below) is known as a conventional method for manufacturing a foam molded product. This method employs an apparatus for manufacturing a foam molded product that is provided with a cavity that is defined between a plurality of mold components by the respective cavity surfaces. This cavity is provided with a foaming start space to which the foam raw material is supplied, and a foaming end space that is continuous with the foaming start space and that the foam raw material reaches by performing a foaming action within the foaming start space. This method includes a placement step in which, of the cavity surfaces, an air-permeable component is placed in the aperture cavity surface where gas venting holes are formed, a supply step in which the foam raw material is supplied to the foaming start space, and a foaming step in which the foam raw material is made to foam until it reaches the foaming end space so that a foam body is formed, and this foam body is then integrally adhered together with the air-permeable component. In this manufacturing method, when the foaming step is being performed, foam gas and air and the like inside the cavity are expelled from the gas venting holes via the air-permeable component while the foam raw material is performing the foaming action inside the cavity, resulting in a foam molded product being formed.

DOCUMENTS OF THE PRIOR ART

Patent Documents

[Patent document 1] Japanese Patent Application, First Publication No. 2004-358910

DISCLOSURE OF THE INVENTION

Problems to be Solved by the Invention

However, in the aforementioned conventional method of manufacturing a foam molded product, when the foaming step is being performed, there is a possibility that the foam gas and air and the like inside the foaming end space will not be expelled from the gas venting holes, and that the foaming of the foam raw material will continue while pockets of foam gas and air and the like remain inside the foaming end space. Because of this, in a foam molded product that is formed by means of this manufacturing method, it is easy for pockets of air to be formed in the foam body by the foam gas and air remaining in the foaming end space, and this makes it difficult to form a foam molded product with a high degree of precision.

The present invention was conceived in view of the above-described circumstances, and it is an object thereof to provide a method of manufacturing a foam molded product that makes it possible to form a foam molded product with a high degree of accuracy.

Means for Solving the Problem

In order to solve the above-described problems, the present invention proposes the following measures. The method of manufacturing a foam molded product according to the present invention is a method of manufacturing a foam molded product in which a foam molded product is formed by integrally adhering together a foam body that is formed by the foaming of a foaming raw material, and an air-permeable component using an apparatus for manufacturing a foam molded product that is provided with a cavity between a plurality of mold components that is defined by respective cavity surfaces of the mold components. In the apparatus for manufacturing the foam molded product, the cavity is provided with a foaming start space to which the foam raw material is supplied, and a foaming end space that is continuous with the foaming start space and that is filled by the foam raw material inside the foaming start space performing a foaming action so as to spread as far as the foaming end space. Of the cavity surfaces, peripheral edge portions of an aperture cavity surface in which gas venting holes open define the foaming end space, and an inner side of peripheral edge portions of this aperture cavity surface define the foaming start space. The method of manufacturing a foam molded product includes: a placement step in which the air-permeable component is placed on the aperture cavity surface so as to cover the gas venting holes; a supply step in which the foam raw material is supplied to the foaming start space; and a foaming step in which the foaming of the foaming raw material continues until it reaches the foaming end space and the foaming end space has become tilled with the foaming raw material so as to form the foam body, and the foam body and the air-permeable component are integrally adhered together. In the placement step, the air-permeating component is placed on the aperture cavity surface such that it is connected to concave gas escape grooves that are formed in peripheral edge portions of the aperture cavity surface.

According to the present invention, when the placement step is being performed, the air-permeating component is placed on the aperture cavity surface so as to be connected to the concave gas escape grooves. Because of this, when the foaming step is being performed, pockets of foam gas and air and the like that remain in the foaming end space can be expelled from the gas venting holes via the concave gas escape grooves and the air-permeable component. Accordingly, the foam molded product can be formed with a high degree of precision.

According to the present invention, when the placement step is being performed, the air-permeable component is placed on the aperture cavity surface such that the outer peripheral edge of the air-permeable component is positioned on the inner side of the peripheral end edge of the aperture cavity surface, which is continuous with the parting surface. As a consequence of this, it is possible to restrain the air-permeable component from becoming placed between the mutually abutting parting surfaces. Furthermore, it is possible to limit any obstruction to the foaming of the foaming component inside the foaming end space, which is caused by the air-permeable component. Accordingly, the interior of the foaming end space can be reliably filled by the foam of the foaming component, and it becomes possible to form a foam molded product with a higher degree of accuracy.

The apparatus for manufacturing a foam molded product according to the present invention is an apparatus for manufacturing a foam molded product that employs the above-described method of manufacturing a foam molded product, and in which the concave gas escape grooves are provided at a distance from the peripheral end edge of the aperture cavity surface, which is continuous with the parting surface.

According to the present invention, the concave gas escape grooves are provided at a distance from the peripheral end edge of the aperture cavity surface. As a consequence, when the foaming step is being performed, the foam raw material that is foaming inside the concave gas escape grooves is not able to intrude between the mutually abutting parting surfaces from the concave gas escape grooves. Accordingly, it is possible to discourage burrs being formed on the foam body, and the foam molded product can be reliably formed at a high level of accuracy.

Moreover, it is also possible for a sealing component to be provided between the mutually abutting parting surfaces so as to seal any gap between these parting surfaces.

In this case, the above-described functions and effects are clearly demonstrated. Namely, because the sealing component is provided between the mutually abutting parting surfaces, when the foaming step is being performed, it is difficult for the foam gas and air and the like that are remaining in the foaming end space to be expelled to the outside between the parting surfaces. However, because this foam gas and air and the like are able to be expelled from the gas venting holes through the concave gas escape grooves and the air-permeable component, it is possible for the foam molded product to be formed with a higher degree of accuracy even more reliably.

The foam molded product according to the present invention is a foam molded product that is formed by integrally adhering together a foam body, which is formed by the foaming of a foaming raw material, and an air-permeable component, and the foam molded product is manufactured by using the above-described method of manufacturing a foam molded product. Convex bar portions are formed by the concave gas escape grooves on the surface of the portion of the foam body that is formed by the foaming end space, and the air-permeable component is integrally adhered to these convex bar portions.

According to the present invention, because the foam molded product is manufactured by using the above-described method of manufacturing a foam molded product, it is difficult for air pockets to be formed in the foam body, and a high-precision foam molded product can be formed.

Effects of the Invention

According to the method of manufacturing a foam molded product and the apparatus for manufacturing a foam molded product of the present invention, it is possible to form a foam molded product with a high degree of accuracy, and a high-precision foam molded product can be obtained as a result.

BEST EMBODIMENTS FOR IMPLEMENTING THE INVENTION (First Embodiment)

Figure 1:
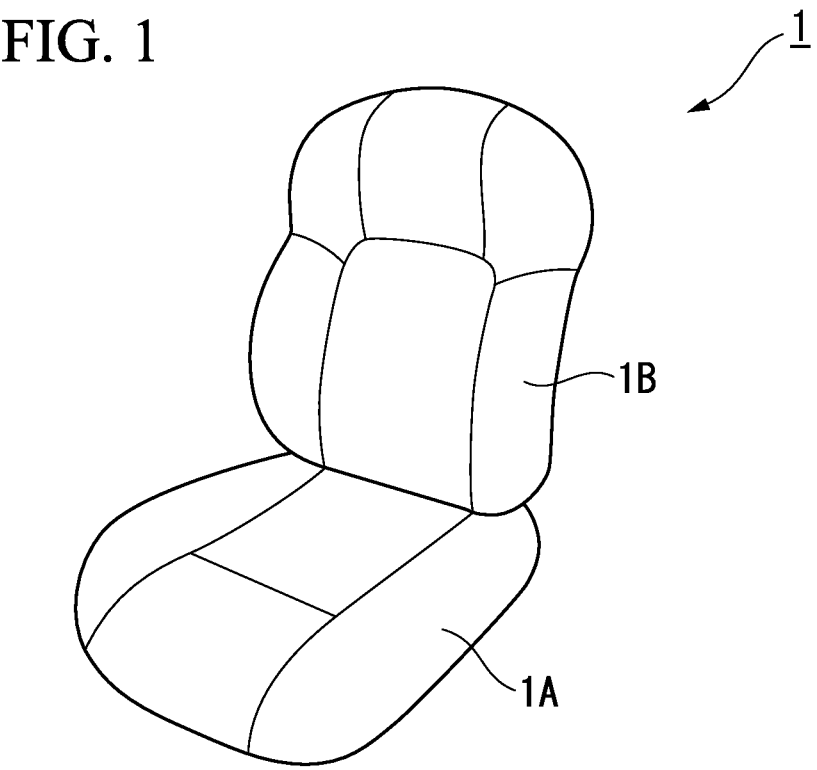
FIG. 1 is a perspective view of a seat that utilizes a seat pad according to the present invention.

Hereinafter, a seat pad according to a first embodiment of the present invention will be described with reference made to the drawings. As is shown in FIG. 1, seat pads 1A and 1B are used in a seat 1 of a vehicle, and are fixed to a seat frame (not shown) of this vehicle. Examples of seat pads 1A and 1B such as these include a cushion pad (1A) that forms a sitting portion of the seat 1 in a vehicle, and a back pad (1B) that forms a back rest portion of the seat 1 in a vehicle. The seat pad 1A of the present embodiment is used as the aforementioned cushion pad. Note that, in the following description, when the seat pads 1A and 1B are fixed to the seat frame, a direction facing directly upwards is referred to as upward, a direction facing directly downwards is referred to as downward, a direction facing towards the front of the vehicle is referred to as forward, and a direction facing towards the rear of the vehicle is referred to as rearward.

Figure 2:
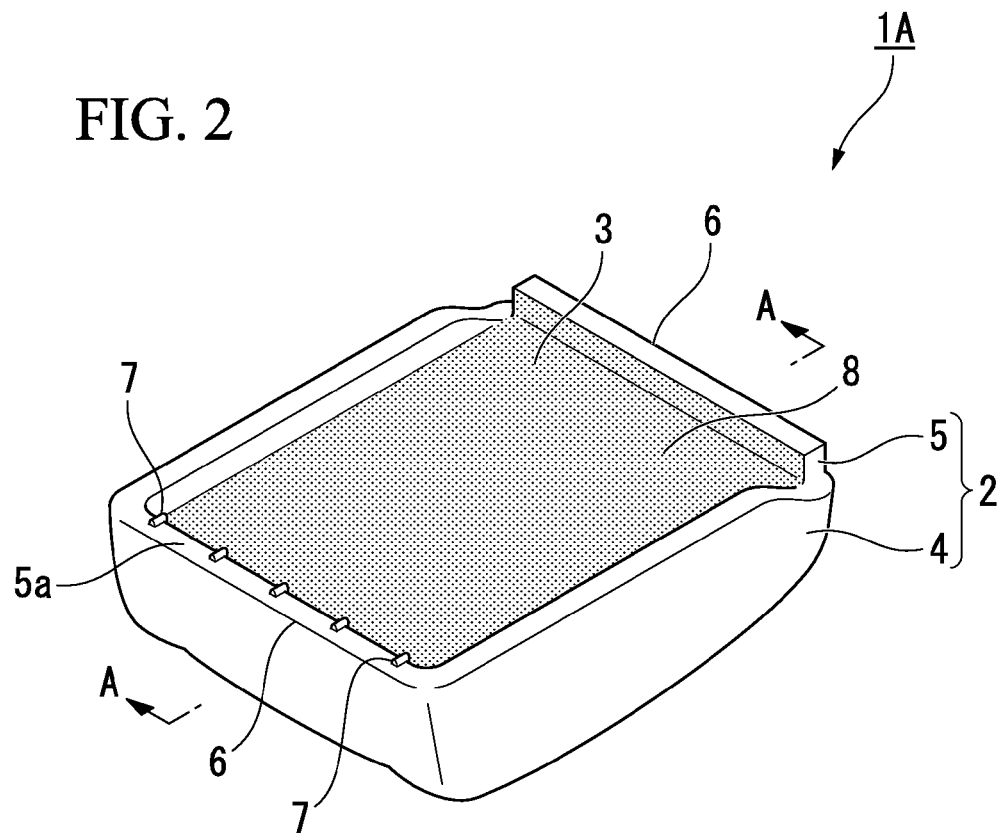
FIG. 2 is a perspective view showing the seat pad according to a first embodiment of the present invention in an inverted state.

As is shown in FIG. 2, the seat pad 1A is formed by integrally adhering together a foam body 2 that is formed by the foaming of a foam raw material, and a reinforcing component (i.e., an air-permeable component) 3. The foam body 2 is formed by the foaming of a foam raw material (for example, a urethane raw material), and is formed, for example, from polyurethane foam or the like. This foam body 2 is provided with a main body portion 4 on whose top surface a person is able to sit, and with a protruding portion 5 that protrudes from a bottom surface of the main body portion 4.

Figure 3:
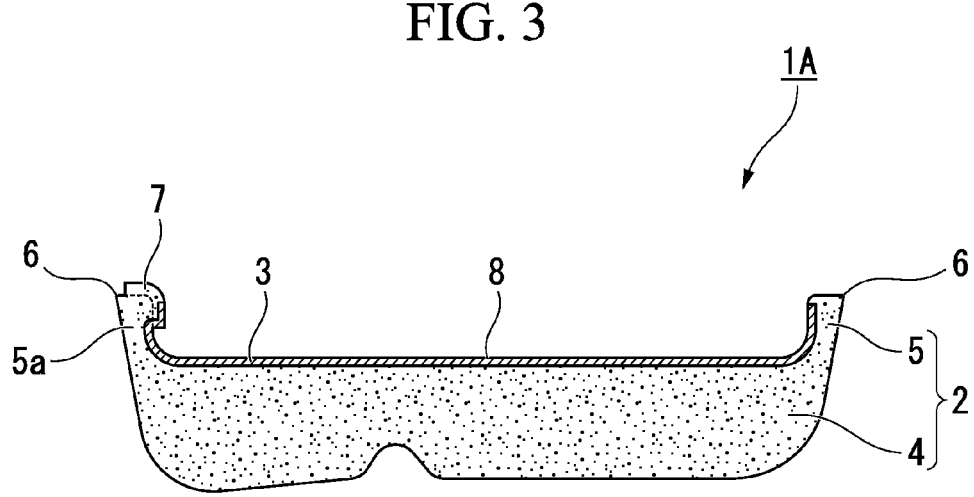
FIG. 3 is a view of a cross-section shown by the arrows A-A in FIG. 2.

The protruding portion 5 extends around substantially the entire periphery of the outer peripheral edge of the main body portion 4. A parting line portion 6 is formed running along the outer peripheral edge on an end surface of the protruding portion 5. Convex bar portions 7 that are formed by concave gas escape grooves 27 of a metal mold (i.e., an apparatus for manufacturing a foam molded product) 20 (described below) are provided protruding from a surface of the protruding portion 5. The convex bar portions 7 are placed at a distance from the parting line portion 6. As is shown in FIG. 3, in a front portion 5*a* of the protruding portion 5 that is positioned on the front side, the convex bar portions 7 are provided in a curved shape so as to extend from an inside surface of the protruding portion 5 that faces towards a center portion of the main body portion 4 as far as an end surface thereof. Furthermore, the plurality of convex bar portions 7 are placed at fixed distances from each other on this front portion 5*a*. The width and protrusion height of the convex bar portions 7 are respectively set, for example, to approximately 2 mm each, and the distance between adjacent convex bar portions 7 is set to approximately 20 mm.

In this foam body 2, the seat frame of the vehicle is able to be fitted inside a concave portion that is defined on the bottom surface side of the main body portion 4 by the main body portion 4 and the protruding portion 5. Furthermore, the bottom surface of the main body portion 4 and the inside surface of the protruding portion 5 form a mounting surface 8 on which the seat frame is mounted.

The reinforcing component 3 is an air-permeable, film-shaped component and is formed, for example, from muslin cloth, coarse woolen felt, or non-woven cloth or the like. The reinforcing component 3 is integrally adhered to the mounting surface 8 of the foam body 2. In particular, in the present embodiment, the reinforcing component 3 is integrally adhered to the entire bottom surface of the main body portion 4, and is also integrally adhered to the inside surface of the front portion 5*a* of the protruding portion 5 and to the convex bar portions 7.

Figure 4:
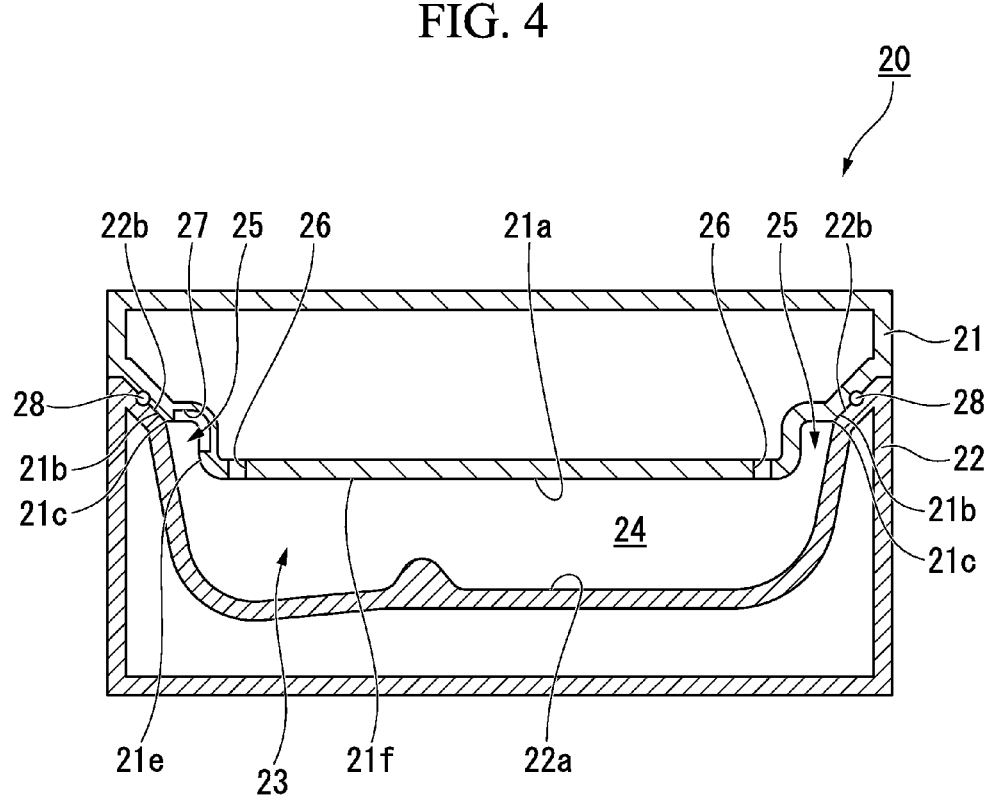
FIG. 4 is a cross-sectional view of a metal mold that forms the seat pad shown in FIG. 2.

Next, as is shown in FIG. 4, a metal mold 20 that is used to manufacture this seat pad 1A will be described. The metal mold 20 is provided with a cavity 23 that is defined between a top mold 21 and a bottom mold 22 (i.e., a plurality of mold components) by a cavity surface 21*a* of the top mold 21 and a cavity surface 22*a* of the bottom mold 22. In the present embodiment, the cavity surface 22*a* of the bottom mold 22 is formed as a depression in a center portion of the bottom mold 22. The cavity surface 21*a* of the top mold 21 is formed by making a center portion of the top mold 21 protrude towards the bottom mold 22. A parting surface 21*b* that is continuous with a peripheral end edge 21*c* of the cavity surface 21*a* of the top mold 21 abuts against a parting surface 22*b* of the bottom mold 22. Between these parting surfaces 21*b* and 22*b*, which are mutually abutting against each other, there is provided a sealing component 28 that seals the gap between the parting surfaces 21*b* and 22*b*.

The cavity 23 is provided with a foaming start space 24 to which the foam raw material is supplied, and a foaming end space 25 that is continuous with the foaming start space 24, and that is filled when the foam raw material performs a foaming action inside the foaming start space 24 and spreads to the foaming end space 25. In the example shown in the drawing, the foaming start space 24 forms the main body portion 4 of the foam body 2, while the foaming end space 25 forms the protruding portion 5 of the foam body 2.

The foaming start space 24 is defined by an inner side 21*f* of a peripheral edge portion 21*e* of the cavity surface 21*a* of the top mold 21, and by an inner side of a peripheral edge portion of the cavity surface 22*a* of the bottom mold 22. Gas venting holes 26 that enable the interior of the cavity 23 to communicate with the exterior thereof provide openings to the foaming start space 24. A plurality of the gas venting holes 26 are formed in the cavity surface (i.e., an aperture cavity surface) 21*a* of the top mold 21. The foaming end space 25 extends around substantially the entire periphery of the outer peripheral edge of the foaming start space 24. This foaming end space 25 is defined by the peripheral edge portion 21*e* of the cavity surface 21*a* of the top mold 21 and by the peripheral edge portion of the cavity surface 22*a* of the bottom mold 22. The peripheral end edge 21*c* of the cavity surface 21*a* of the top mold 21 is positioned in this foaming end space 25.

In the present embodiment, the concave gas escape grooves 27 are formed in the peripheral edge portion 21*e* of the cavity surface 21*a* of the top mold 21. The concave gas escape grooves 27 are provided at a distance from the peripheral end edge 21 c of the cavity surface 21*a* of the top mold 21. Moreover, the concave gas escape grooves 27 extend in a direction in which the foaming of the foam raw material advances from the foaming start space 24 towards the foaming end space 25 (i.e., in the foaming direction). In the example shown in the drawing, a plurality of concave gas escape grooves 27 are formed at intervals from each other in the cavity surface 21*a* of the top mold 21 such that they open onto the portion of the foaming end space 25 where the front portion 5*a* of the protruding portion 5 of the foam body 2 is formed. The width and depth of the concave gas escape grooves 27 are respectively set, for example, to approximately 2 mm each, and the distance between adjacent concave gas escape grooves 27 is set to approximately 20 mm.

Figure 5:
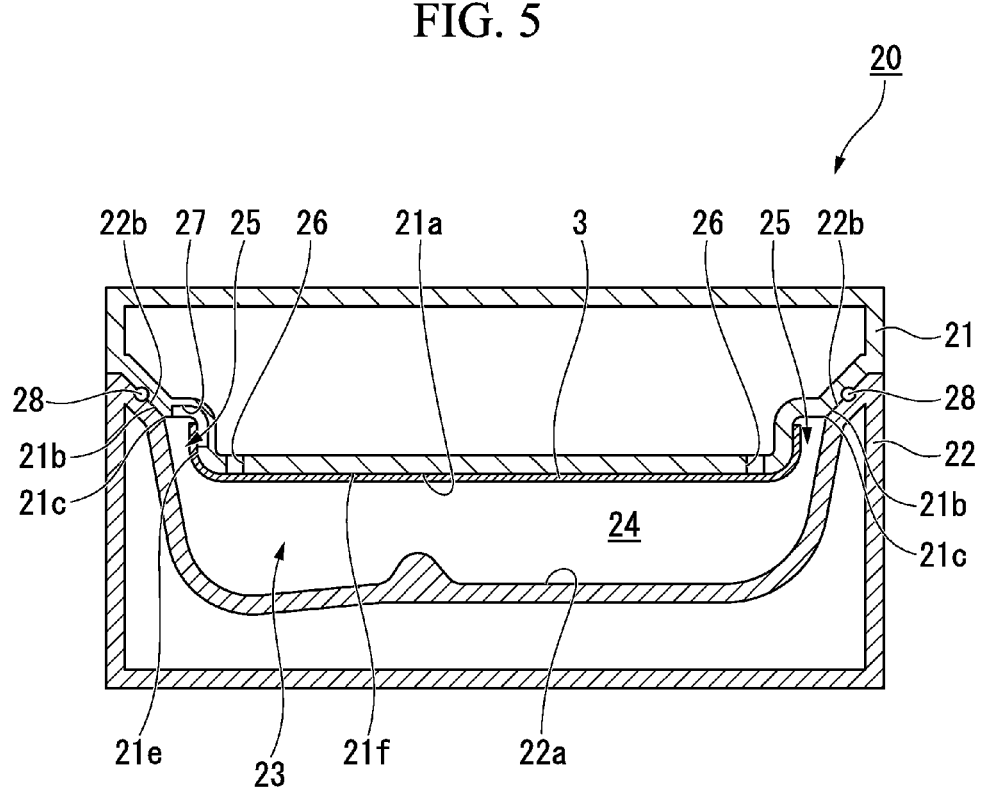
FIG. 5 is a cross-sectional view of a metal mold that illustrates a seat pad manufacturing method that forms the seat pad shown in FIG. 2.

Next, a seat pad manufacturing method for forming the seat pad 1A by using this metal mold 20 will be described. Firstly, as is shown in FIG. 5, with the metal mold 20 in an open state, a placement step is performed in which the reinforcing component 3 is placed on the cavity surface 21*a* of the top mold 21 so as to cover the gas venting holes 26. At this time, the reinforcing component 3 is placed on the cavity surface 21*a* of the top mold 21 so as to be connected to the concave gas escape grooves 27. When the reinforcing component 3 is being placed on the cavity surface 21*a* of the top mold 21, the outer peripheral edge of the reinforcing component 3 is positioned on the inner side of the peripheral end edge 21*c* of the cavity surface 21*a* of the top mold 21.

Next, a supply step is performed in which the foam raw material is supplied to the foaming start space 24. In this supply step, the foam raw material is injected, for example, into that portion of the inner side of the cavity surface 22*a* of the bottom mold 22 where it is planned to form the foaming start space 24, and the metal mold 20 is then closed.

Next, a foaming step is performed in which the foam raw material is made to foam inside the foaming start space 24. The foam raw material foams in the foaming direction so that the interior of the cavity 23 gradually becomes full of the foam raw material. At this time, the foam gas and air inside the foaming start space 24 are expelled from the gas venting holes 26 via the reinforcing component 3, which is gas-permeable. Moreover, the foam gas and air inside the foaming end space 25 are expelled from the gas venting holes 26 via the concave gas escape grooves 27 and the reinforcing component 3.

The foam raw material then reaches the foaming end space 25 so that the foaming end space 25 is filled with the foam raw material. The foaming of the foam raw material then abates, and the resinification (i.e., the resin reaction) of the foam raw material progresses so that the foam body 2 is formed inside the cavity 23, and the reinforcing component 3 is integrally adhered to the foam body 2. As a result, the seat pad 1A, which is capable of maintaining a fixed shape, is formed, and this foaming step is ended. Thereafter, the metal mold 20 is opened, and a demolding step is performed in which the seat pad 1A is demolded from the metal mold 20. As a result, the seat pad 1A is obtained.

As has been described above, according to the method of manufacturing a seat pad according to the present embodiment, when the placement step is being performed, the reinforcing component 3 is placed on the cavity surface 21*a* of the top mold 21 so as to be connected to the concave gas escape grooves 27. Because of this, when the foaming step is being performed, any foam gas and air and the like remaining in the foaming end space 25 can be expelled from the gas venting holes 26 via the concave gas escape grooves 27 and the reinforcing component 3. As a consequence of this, the seat pad 1A can be formed with a high degree of accuracy.

Moreover, in the present embodiment, when the placement step is being performed, the reinforcing component 3 is placed on the cavity surface 21*a* of the top mold 21 such that the outer peripheral edge of the reinforcing component 3 is positioned on the inner side of the peripheral end edge 21*c* of the cavity surface 21*a* of the top mold 21. In this case, it is possible to restrain the reinforcing component 3 from becoming placed between the mutually abutting parting surfaces 21*b* and 22*b*.

Furthermore, when the placement step is being performed, by placing the reinforcing component 3 on the cavity surface 21*a* of the top mold 21 such that the outer peripheral edge of the reinforcing component 3 is positioned on the inner side of the peripheral end edge 21*c* of the cavity surface 21*a* of the top mold 21, it is possible to limit any obstruction caused by the reinforcing component 3 to the foaming of the foaming component inside the foaming end space 25. Accordingly, the interior of the foaming end space 25 can be reliably filled by the foaming component as a result of the foaming component performing a foaming action, so that the seat pad 1A can be formed at a higher level of accuracy.

Moreover, in the present embodiment, in the metal mold 20, the concave gas escape grooves 27 are provided at a distance from the peripheral end edge 21*c* of the cavity surface 21*a* of the top mold 21. Because of this, when the foaming step is being performed, the foam raw material that is foaming inside the concave gas escape grooves 27 is not able to intrude between the mutually abutting parting surfaces 21*b* and 22*b* from the concave gas escape grooves 27. Accordingly, it is possible to discourage burrs being formed on the foam body 2, and the seat pad 1A can be reliably formed at a high level of accuracy.

Moreover, in the present embodiment, the sealing component 28 is interposed between the mutually abutting parting surfaces 21*b* and 22*b*. Because of this, the above-described functions and effects are effectively demonstrated by the concave gas escape grooves 27 and the reinforcing component 3. Namely, because the sealing component 28 is provided between the mutually abutting parting surfaces 21*b* and 22*b*, when the foaming step is being performed, it is difficult for the foam gas and air and the like that are remaining in the foaming end space 25 to be expelled to the outside between the parting surfaces 21*b* and 22*b*. However, this foam gas and air and the like are able to be expelled from the gas venting holes 26 through the concave gas escape grooves 27 and the reinforcing component 3. Because of this, it is possible to for the seat pad 1A to be formed at a high level of accuracy even more reliably.

Moreover, in the present embodiment, the seat pad 1A is manufactured by using the above-described seat pad manufacturing method. Because of this, it is difficult for air pockets to be formed in the foam body 2, and a high-precision seat pad 1A can be formed.

(Second Embodiment)

Next, a seat pad according to a second embodiment of the present invention will be described. In this second embodiment, component elements that are the same as those in the first embodiment are given the same descriptive symbols and no description thereof is given. Only points of variance from the first embodiment are described.

Figure 6:
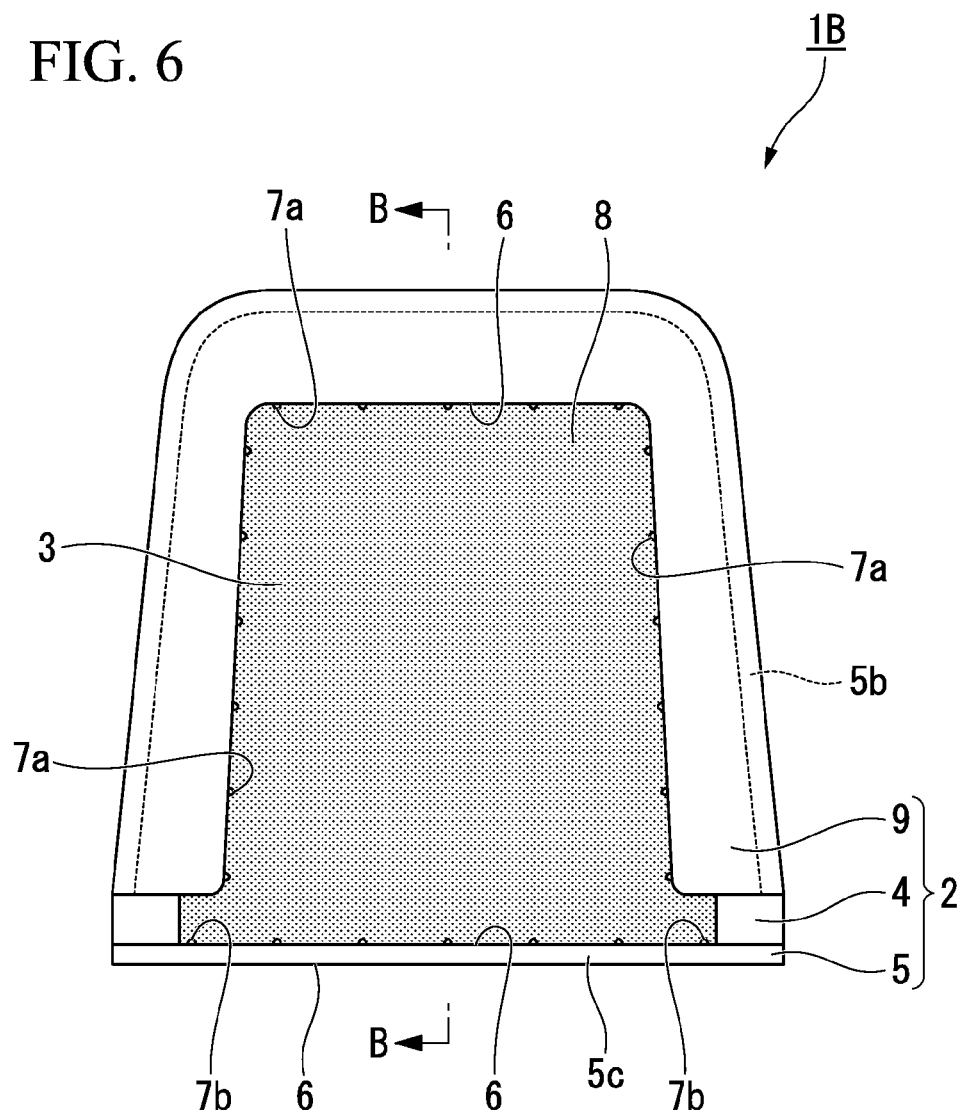
FIG. 6 is a plan view showing the seat pad according to a second embodiment of the present invention in an inverted state.
Figure 7:
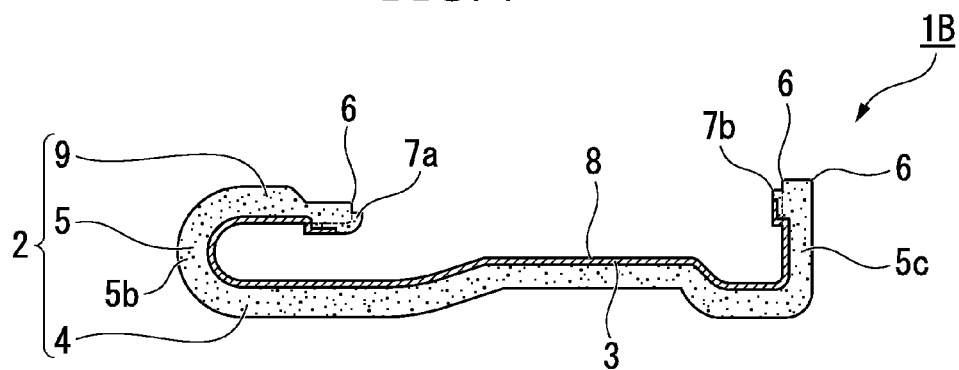
FIG. 7 is a view of a cross-section shown by the arrows B-B in FIG. 6.

As is shown in FIG. 1, a seat pad 1B of the present embodiment is used as the aforementioned back pad, and is formed such that the back of an occupant of the vehicle rests against a front surface of the main body portion 4 of the foam body 2. As is shown in FIG. 6 and FIG. 7, the foam body 2 is provided with a main body portion 4, a protruding portion 5, and a folded-back portion 9 that extends from the protruding portion 5 towards the center portion of the main body portion 4. The folded-back portion 9 is provided on an inverted U-shaped upper portion 5*b* of the protruding portion 5 that, when seen in plan view, extends from both side edges of the main body portion 4 as far as a top edge thereof and a parting line portion 6 is formed along a distal end surface of this folded-back portion 9.

A plurality of convex bar portions 7*a* and 7*b* are provided respectively on the folded-back portion 9 and on a lower portion 5*c* that is positioned on the bottom side of the protruding portion 5. As is shown in FIG. 7, of the convex bar portions 7*a* and 7*b*, the convex bar portions 7*a*, which are provided on the folded-back portion 9, are bent so as to extend from an inside surface of the folded-back portion 9 that faces towards the main body portion 4 as far as an end surface thereof Furthermore, the plurality of convex bar portions 7*a* are arranged at fixed distances from each other on the folded-back portion 9. Moreover, of the convex bar portions 7*a* and 7*b*, the convex bar portions 7*b* are provided on the lower portion 5*c* of the protruding portion 5. The plurality of convex bar portions 7*b* are arranged at fixed distances from each other in a rectilinear configuration on an inside surface of the lower portion 5*c*.

In this foam body 2, the mounting surface 8 is formed by a rear surface of the main body portion 4, and the inside surfaces of the protruding portion 5 and the folded-back portion 9. In the present embodiment, the reinforcing component 3 is integrally adhered to the entire rear surface of the main body component 4, the inside surfaces of the protruding portion 5 and the folded-back portion 9, and the convex bar portions 7*a* and 7*b*.

Figure 8:
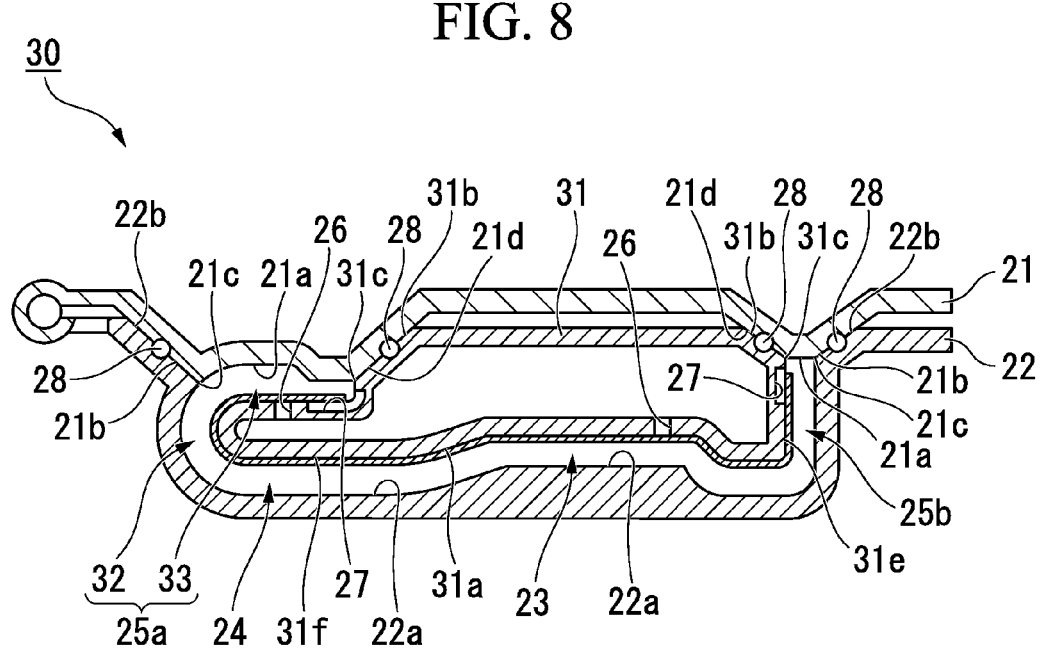
FIG. 8 is a cross-sectional view of a metal mold that forms the seat pad shown in FIG. 6.

Next, as is shown in FIG. 8, a metal mold 30 that is used to manufacture this seat pad 1B will be described. In the present embodiment, the metal mold 30 is provided with the top mold 21, the bottom mold 22, and a center mold 31 that is attached to the top mold 21. The center mold 31 is placed between central portions of the top mold 21 and the bottom mold 22, and is attached to the central portion of the top mold 21.

A parting surface 31*b* of the center mold 31 is abutted against a parting surface 21*d* that is formed in a central portion of the top mold 21, and the sealing component 28 is interposed between these parting surfaces 31*b* and 21*d*. A plurality of the gas venting holes 26 are provided in the center mold 31, and these open onto a cavity surface (i.e., an aperture cavity surface) 31*a* of the center mold 31. The foaming start space 24 is defined by an inner side 31*f* of a peripheral edge portion 31*e* of the cavity surface 31*a* of the center mold 31, and by the inner side of the peripheral edge portion of the cavity surface 22*a* of the bottom mold 22.

Out of two foaming end spaces 25*a* and 25*b*, a first foaming end space 25*a* that forms the upper portion 5*b* of the protruding portion 5 is provided with a first end portion 32 that forms the protruding portion 5, and a second end portion 33 that forms the folded-back portion 9 that is continuous with the first end portion 32. The second end portion 33 is defined by the cavity surface 21a of the top mold 21, and a peripheral edge portion 31e of the cavity surface 31a of the center mold 31. The peripheral end edge 31c of the cavity surface 31a of the center mold 31 is positioned on the second end portion 33. In addition, the concave gas escape grooves 27 are formed in the portion of the peripheral edge portion 31e of the cavity surface 31 of the center mold 31 that defines the second end portion 33.

On the other hand, the second foaming end space 25b of the two foaming end spaces 25a and 25b that forms the lower portion 5c of the protruding portion 5 is defined by the cavity surface 21a of the top mold 21, the peripheral edge portion of the cavity surface 22a of the bottom mold 22, and the peripheral edge portion 31e of the cavity surface 31a of the center mold 31. The peripheral end edge 31c of the cavity surface 31a of the center mold 31 is positioned in this second end foam space 25b. A plurality of the concave gas escape grooves 27 are arranged at intervals from each other in the portion of the peripheral edge portion 31e of the cavity surface 31a of the center mold 31 that defines the second foaming end space 25b.

As has been described above, according to the method of manufacturing a seat pad, the metal mold 30, and the seat pad 1B of the present embodiment, the same type of functions and effects are obtained as from the first embodiment.

Note that the range of technology of the present invention is not limited to the above-described embodiments, and various modifications may be made thereto insofar as they do not depart from the scope of the present invention. For example, in each of the above-described embodiments, the sealing component 28 is interposed between the parting surfaces 21b, 22b, 31b, and 21d of the metal molds 20 and 30. However, it is also possible for the sealing component 28 to be omitted.

Moreover, in each of the above-described embodiments, a plurality of the gas venting holes 26 and a plurality of the concave gas escape grooves 27 are formed in the metal mold 20. However, it is also possible for only one gas venting hole 26 and only one concave gas escape groove 27 to be provided. Furthermore, in each of the above-described embodiments, the seat pads 1A and 1B are formed by integrally adhering the air-permeable reinforcing component 3 to the foam body 2. However, instead of the reinforcing component 3, it is also possible to employ a different component from the reinforcing component 3 that is also air-permeable. Furthermore, in each of the above-described embodiments, the seat pads 1A and 1B are employed as foam molded products. However, provided that the foam molded product is created by integrally adhering together a foam body and an air-permeable component, then it is not limited to seat pads.

In addition to this, the component elements of the embodiments may also be replaced, where appropriate, with known component elements insofar as they do not depart from the scope of the present invention, and different combinations of the aforementioned variant examples may also be employed where appropriate.

INDUSTRIAL APPLICABILITY

According to the method of manufacturing a foam molded product and the apparatus for manufacturing a foam molded product of the present invention, it is possible to form a foam molded product with a high degree of accuracy, and to thereby obtain a highly precise foam molded product.

DESCRIPTION OF THE REFERENCE NUMERALS 1A, 1B . . . Seat pad (Foam molded product)
2 . . . Foam body
3 . . . Reinforcing component
7, 7a, 7b . . . Convex bar portion
20, 30 . . . Metal mold (Foam molded product manufacturing apparatus)
21 . . . Top mold (Mold component)
21a, 22a, 31a . . . Cavity surface
21b, 21d, 22b, 31b . . . Parting surface
21c, 31c . . . Cavity surface peripheral end edge
21e, 31e . . . Cavity surface peripheral edge portion
21f, 31f . . . Cavity surface peripheral edge portion inner side
22 . . . Bottom mold (Mold component)
23 . . . Cavity
24 . . . Foaming start space
25, 25a, 25b . . . Foaming end space
26 . . . Gas venting hole
27 . . . Concave gas escape groove
28 . . . Sealing component
31 . . . Center mold (Mold component)

The invention claimed is:

1. A method of manufacturing a foam molded product in which a foam molded product is formed by integrally adhering together a foam body that is formed by the foaming of a foam raw material, and an air-permeable component using an apparatus for manufacturing a foam molded product that is provided with a cavity between a plurality of mold components that is defined by respective cavity surfaces of the plurality of mold components, wherein the cavity is provided with a foaming start space to which the foam raw material is supplied, and a foaming end space that is continuous with the foaming start space and that is filled by the foam raw material inside the foaming start space performing a foaming action so as to spread as far as the foaming end space, and, of the cavity surfaces, peripheral edge portions of an aperture cavity surface in which gas venting holes open define the foaming end space, and an inner side of peripheral edge portions of this aperture cavity surface define the foaming start space, and concave gas escape grooves are provided at a distance from the gas venting holes, and extend in a direction in which the foaming of the foam raw material advances from the foaming start space to the foaming end space, said gas escape grooves communicating with gas venting holes; and wherein the method of manufacturing a foam molded product includes:

a placement step in which the air-permeable component is placed on the aperture cavity surface so as to cover the gas venting holes;

a supply step in which the foam raw material is supplied to the foaming start space; and a foaming step in which the foaming of the foam raw material continues until it reaches the foaming end space and the foaming end space has become filled with the foam raw material so as to form the foam body, and the foam body and the air-permeable component are integrally adhered together, and wherein, in the placement step, the air-permeable component is placed on the aperture cavity surface such that it is connected to the concave gas escape grooves that are formed in peripheral edge portions of the, aperture cavity surface, and wherein, in the foaming step, foam gas is expelled from the gas venting holes via the concave gas escape grooves and the air-permeable component.

\* \* \* \* \*